United States Patent
Gillen, Jr.

(10) Patent No.: US 6,357,126 B1
(45) Date of Patent: Mar. 19, 2002

(54) TRAILER HITCH ALIGNMENT DEVICE

(76) Inventor: William F. Gillen, Jr., P.O. Box 208, Kenner, LA (US) 70063

( * ) Notice: Subject to any disclaimer, the term of this patent is extended or adjusted under 35 U.S.C. 154(b) by 0 days.

(21) Appl. No.: 09/569,105

(22) Filed: May 10, 2000

(51) Int. Cl.[7] .............................................. B60D 1/36
(52) U.S. Cl. ........................... 33/264; 33/286; 280/477
(58) Field of Search ........................ 33/264, 286, 288; 116/28 R; 280/477

(56) References Cited

U.S. PATENT DOCUMENTS

| | | | |
|---|---|---|---|
| 3,767,230 A | * 10/1973 | DeVries | 280/477 |
| 4,065,147 A | * 12/1977 | Ross | 280/477 |
| 4,583,481 A | * 4/1986 | Garrison | 116/28 R |
| 4,708,359 A | 11/1987 | Davenport | |
| 4,856,200 A | * 8/1989 | Riggs | 33/264 |
| 5,009,445 A | * 4/1991 | Williams, Jr. | 280/477 |
| 5,036,593 A | * 8/1991 | Collier | 33/264 |
| 5,180,182 A | * 1/1993 | Haworth | 280/477 |
| 5,309,289 A | 5/1994 | Johnson | |
| 5,335,930 A | 8/1994 | Tighe | |
| 5,482,310 A | 1/1996 | Staggs | |
| 5,513,870 A | * 5/1996 | Hickman | 280/477 |
| 5,680,706 A | 10/1997 | Talcott | |
| 6,076,847 A | * 6/2000 | Thornton | 280/477 |
| 6,259,357 B1 | * 7/2001 | Heider | 280/477 |

* cited by examiner

Primary Examiner—G. Bradley Bennett
(74) Attorney, Agent, or Firm—Kenneth L Tolar

(57) ABSTRACT

A device for a aligning a trailer hitch ball with a trailer coupling includes an elongated guide strip that is positioned on the ground with a portion immediately beneath the ball on the towing vehicle and a second portion immediately beneath the trailer coupling. A first target is mounted on the trailer hitch ball while a second target is mounted on the trailer coupling. A convex mirror assembly is mounted on the rear of the towing vehicle using any one of a plurality of adjustable mounting brackets. The mirror is positioned such that the towing vehicle driver can see the trailer hitch ball and the target mounted thereon. The towing vehicle driver reverses the vehicle while guiding the first target along the alignment strip. When the driver observes that the first and second targets are aligned, the coupling is properly aligned with the trailer hitch ball.

11 Claims, 5 Drawing Sheets

TRAILER HITCH ALIGNMENT DEVICE

BACKGROUND OF THE INVENTION

The present invention relates to a device for assisting the driver of a towing vehicle with properly aligning a trailer hitch ball and a trailer coupling.

DESCRIPTION OF THE PRIOR ART

A trailer is typically attached to a towing vehicle using a trailer hitch. The trailer hitch includes a ball mounted on the rear of the vehicle to which a coupling on the trailer is secured. Aligning the trailer hitch ball with the trailer coupling, however, has always been cumbersome and difficult, especially for an unassisted driver. Typically, the driver reverses the vehicle towards the trailer while attempting to observe the trailer coupling and ball in the rear or side view mirror. However, because of the position and size of the mirrors, the trailer hitch ball or coupling is not always visible requiring the driver to reverse and advance the vehicle repeatedly before successfully maneuvering the ball in the vicinity of the coupling. Even once both components are visible, the driver's depth perception is hindered such that the towing vehicle often collides with the trailer. At best, the driver is able to position the trailer hitch ball within a few feet of the trailer coupling eventually requiring the driver to manually move the trailer until the coupling is properly positioned over the ball. The present invention provides a device that assists a driver in positioning the trailer hitch ball immediately beneath the trailer coupling.

Various devices for assisting the driver of a towing vehicle with aligning a trailer hitch ball with a trailer coupling exist in the prior art. For example, U.S. Pat. No. 5,309,289 issued to Johnson relates to an optical target system for assisting a vehicle operator in aligning the hitch assembly components of a towing vehicle and a trailer. A cross-shaped target is mounted on each hitch component. A convex mirror assembly is mounted to the trailer to allow a vehicle operator to view the two targets. The vehicle is backed toward the trailer until the two cross-shaped targets are aligned.

U.S. Pat. No. 5,335,930 issue to Tighe discloses a construction site hauling system including masts that are positioned on both a towing vehicle and a trailer. The masts are visible from the vehicle passenger compartment. Vertical alignment and physical connection are accomplished using jacks or a similar lifting means positioned on the trailer. The lifting means is operated by a wireless control signal transmitted from the cab.

U.S. Pat. No. 5,6800,706 issued to Talcott relates to a device for aligning a trailer and towing vehicle including a visible mast placed on the trailer tongue so that the towing vehicle driver can view the mast. The mast includes a pivotal leg that can be secured in either an extended or collapsed position.

U.S. Pat. No. 5,482,310 issued to Staggs discloses a trailer hitch mirror alignment device including a mounting bracket with a pair of telescopically adjustable legs attached thereto. A mirror is pivotally and adjustably attached to the distal ends of the legs. The bracket is magnetically attachable to the rear surface of the towing vehicle. The device can be adjusted to allow the driver to view both components of the trailer hitch assembly.

U.S. Pat. No. 4,708,359 issued to Davenport discloses a trailer hitching apparatus including a pair of sight rods attached adjacent each side of the trailer hitch ball. The sight rods extend outwardly so as to be readily visible to the vehicle driver. A trailer sighting rod is attached to the trailer coupling. An angled loading plate is positioned between the two sighting rods and includes an opening surrounded by a load pin guide rail. A loading pin is attached to the trailer tongue directly above the coupling. As the vehicle is reversed, the driver will guide the vehicle such that the vehicle sighting rods will be on each side of the trailer sighting rod thereby guiding the load pin onto the angled loading plate until the pin seats within the plate opening. Simultaneously, the trailer hitch coupling is automatically lifted onto the trailer hitch ball.

Each of the above described devices has several disadvantages. Although each of the devices includes targets or masts to make the hitch components more visible, none include a means for directly guiding the trailer hitch ball to a position immediately beneath the trailer hitch coupling. Accordingly, the vehicle driver will likely have to reverse and advance the vehicle several times until the targets or hitch components are properly aligned. Furthermore, due to the nature of the above described targets, faulty depth perception may prevent the driver from accurately determining whether the targets are properly positioned. The present invention provides an alignment device that includes a guide strip along which the driver guides a first target directly to the second target whereby the driver must only reverse the vehicle once. Furthermore, the targets are configured such that the driver can easily determine when the targets are properly aligned.

SUMMARY OF THE INVENTION

The present invention relates to a device for assisting a towing vehicle driver in aligning two trailer hitch components. The device includes a foldable guide strip that is placed on the ground to extend from beneath the trailer hitch ball to a position immediately beneath the trailer coupling, providing a guide path therebetween. A convex mirror assembly is mounted to the rear of the vehicle using any one of a plurality of adjustable bracket assemblies allowing the mirror to be positioned so that the driver can see the strip and the trailer hitch ball. The trailer coupling will also be visible as the ball approaches the trailer coupling. A first target is positioned on the upper surface of the trailer hitch ball. The first target includes a pair of similarly colored, spaced outer cups with a differing colored inner cup disposed therebetween. A second target is attached to the upper surface of the trailer hitch coupling. The second target is a cup colored identically to the outer cups on the first target. Once the assembly is secured as described above, the driver views the first target in the rear view mirror and reverses the vehicle toward the trailer while guiding the inner cup along the alignment strip. Whenever the trailer is properly positioned beneath the trailer hitch ball, the second target will be superimposed on the inner cup whereby the driver will see three aligned, identically colored cups. It is therefore an object of the present invention to provide a device for assisting a driver in aligning trailer hitch components. It is another object of the present invention to provide a trailer hitch alignment device that includes a guide path between the trailer coupling and trailer hitch ball. It is yet another object of the present invention to provide a trailer hitch alignment device that includes a plurality of adjustable bracket assemblies allowing the convex mirror to be mounted at a desired position. It is yet another object of the present invention to provide a trailer alignment device that can be quickly and immediately installed without the use of tools. Other objects, features and advantages of the present invention will become readily apparent from the following detailed description of the preferred embodiment when considered with the attached drawings and the appended claims.

DESCRIPTION OF THE PREFERRED EMBODIMIENT

A trailer 52 typically includes a female coupling that receives a trailer hitch ball mounted on the rear of a towing vehicle 75. The present invention relates to a device for assisting the driver of a towing vehicle with aligning the trailer hitch ball with a trailer coupling.

The alignment device includes an elongated guide strip 2 formed of multiple hinged sections 4 allowing the strip to be compactly folded for storage. The strip is placed on the ground with a first portion immediately beneath the trailer hitch ball on the towing vehicle and a second portion immediately beneath the trailer hitch coupling. The strip, therefore, provides a guide path directly between the trailer hitch ball and trailer coupling.

Figure 2:
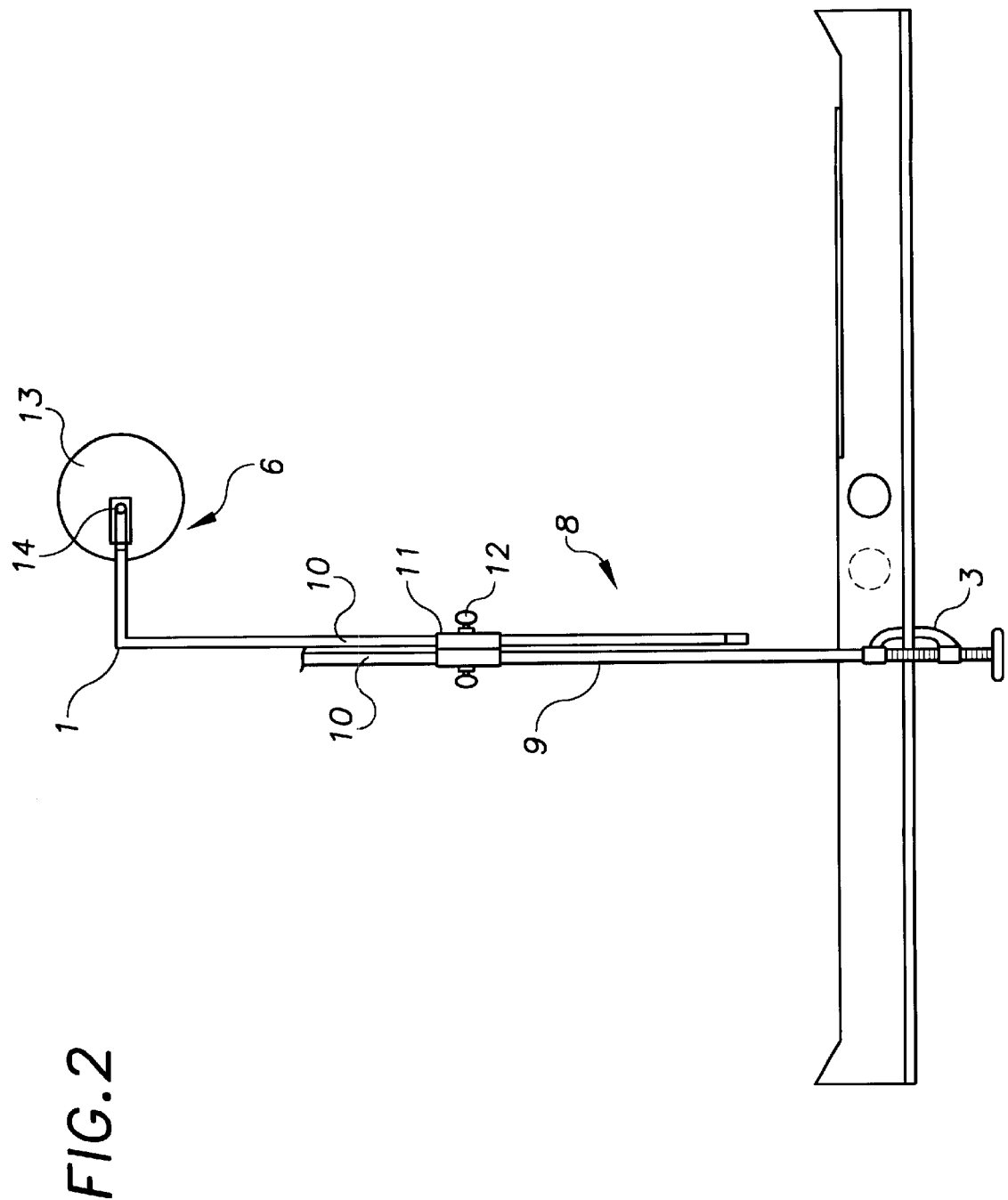
FIG. 2 depicts the mirror assembly mounted to a vehicle bumper using a first bracket assembly.

The device also includes a mirror assembly 6 that is attached to the rear of the towing vehicle using one of two adjustable bracket assemblies. Referring to FIG. 2, a first bracket assembly 8 includes an elongated length adjustable leg 9 having a top end and a bottom end. The leg includes two or more juxtaposed leg sections 10 joined with double sleeves 11. Each sleeve includes a hand bolt 12 threadedly received within a bore on a side thereof. Accordingly, each leg section may be moved within its corresponding sleeve by loosening and retightening the hand bolt thereby allowing the length of the leg to be varied. The upper end of the[]leg includes an elbow 1 (preferably ninety degrees) having an externally threaded distal end.

The mirror assembly 6 includes a convex mirror 13 attached to a shaft 14 using a ball and socket joint so that the mirror can be pivoted relative thereto. The shaft is secured to a sleeve that is threadedly fastened to the distal end of the upper elbow. The mirror assembly can be attached to the leg using other conventional fastening means, as well.

Figure 3:
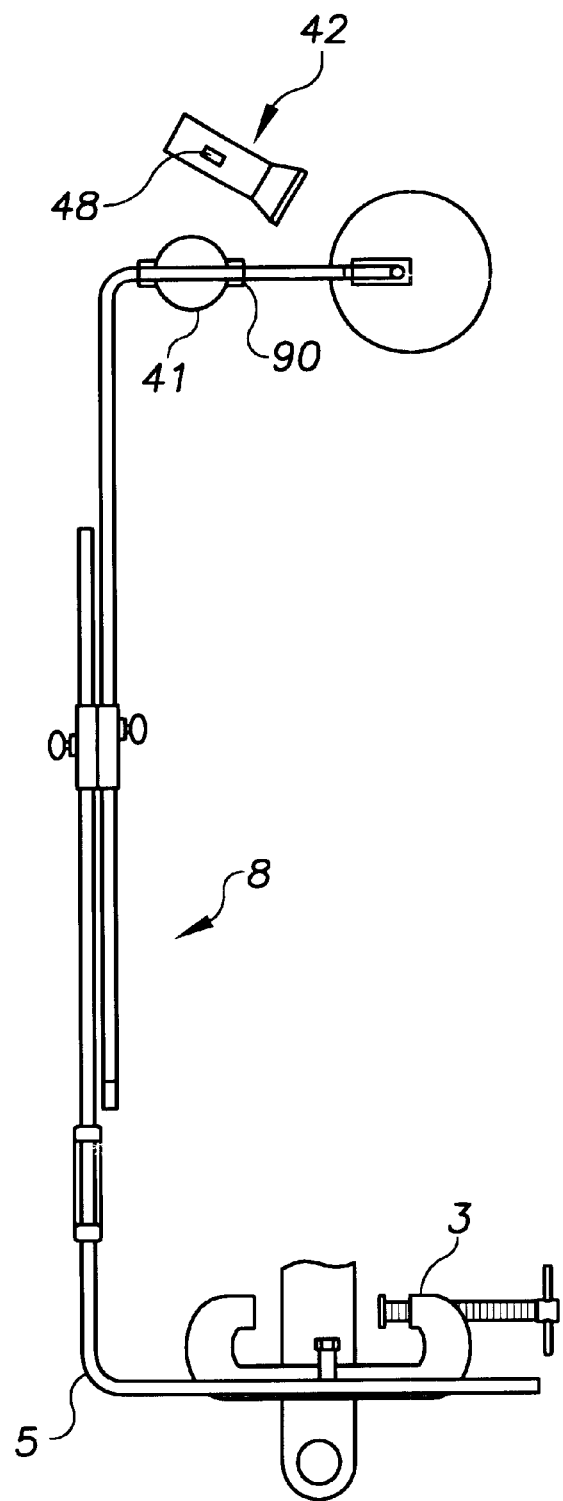
FIG. 3 is a perspective view of the mirror assembly mounted to a vehicle draw bar using a variation of the bracket assembly depicted in FIG. 2.

Secured to the lower end of the leg is a C-clamp 3 which is vertically fastened to the planar, horizontally extending portion found on the rear bumper of certain vehicles. As depicted in FIG. 3, the leg could include an optional elbow 5 (i.e. ninety degrees) between the lower end and the C-clamp if the clamp is horizontally fastened to the draw bar so that the leg extends vertically. In either case, the leg can be rotated within the sleeves to vary the position of the mirror. Once the mirror is properly positioned, the hand bolts are tightened.

Figure 4:
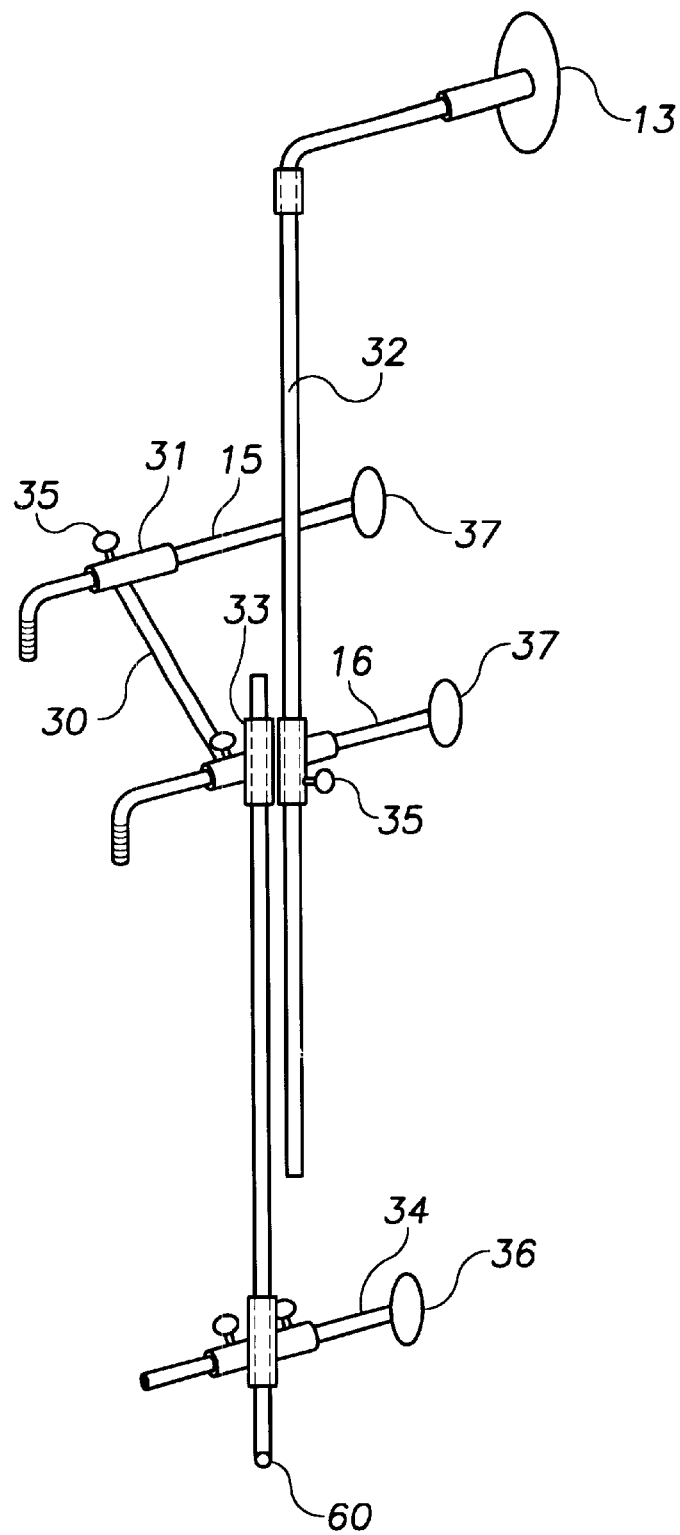
FIG. 4 depicts a second bracket assembly.
Figure 5:
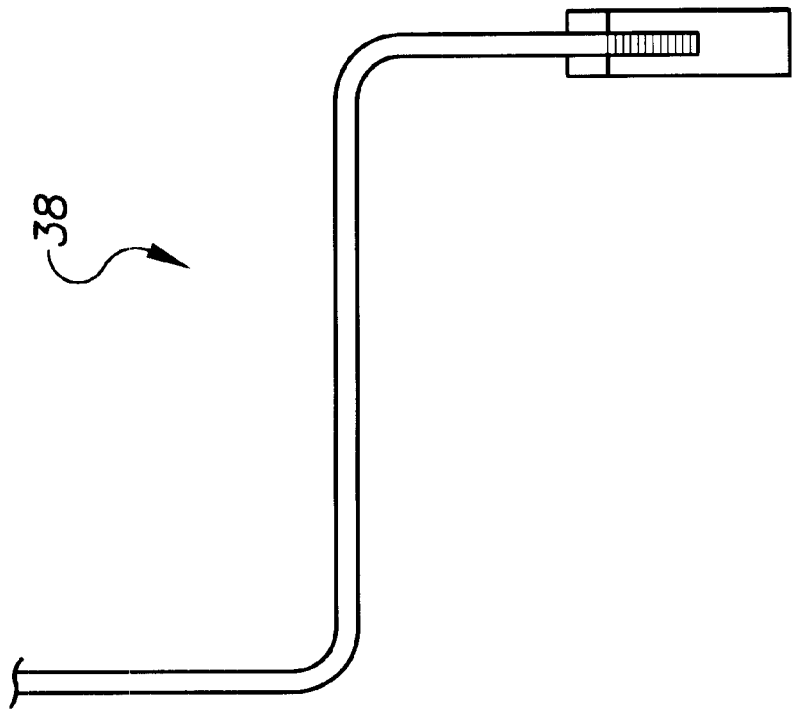
FIG. 5 depicts the bypass attachmnent of the bracket assembly.

A second bracket assembly is depicted in FIG. 4. The second bracket assembly includes an elongated leg 32 having an externally threaded upper end for threadedly engaging the sleeve on the mirror assembly. As with the first bracket assembly, the leg could be length adjustable. Slidably mounted on the leg is a support brace 15 including a pair of spaced, substantially L-shaped arms 16 each having a pair of opposing ends. The arms are interconnected with a cross bar 30. Each end of the cross bar includes a horizontal sleeve 31 with one of the arms received therein. One of the sleeves includes a vertical sleeve 33 attached thereto that receives the leg. Each sleeve includes a hand bolt 35 as described above so that the positioning of the leg relative to the arms can be both horizontally and vertically adjusted. The lower end of the leg preferably includes a foot pad 60 for resting on the upper surface of the rear bumper. As with the first bracket assembly, the leg is preferably length adjustable.

A suction cup 37 is attached to either end of the arm depending upon the type of vehicle being used. If the device is being secured to a utility vehicle, a truck or similar vehicle having a vertical rear hatch or tailgate, the suction cups are attached to a first end of the arms so that they face outwardly. If the device is being attached to a vehicle having a trunk or similar horizontal surface, the suction cups are attached to the opposing end so that they face downwardly. Furthermore, a third arm 34 with a suction cup 36 mounted thereon may be slidably mounted on the leg for providing additional support, if necessary. Therefore, the bracket assembly and thus the convex mirror can be mounted on the rear of the vehicle by attaching the suction cups thereto.

Either bracket assembly can also include a removable, substantially S-shaped bypass attachment 38 for use with vehicles having an exterior, rear-mounted spare tire. The bypass attachment is secured to an intermediate portion of either leg using sleeves and bolts as described above or any other conventional means.

The leg of either bracket assembly can also include a ferromagnetic plate 41 mounted thereon. A light 42 can be removably fastened to the plate using a magnet 48 if the alignment device is being used at night. The plate is preferably mounted on a sleeve 90 having a hand bolt that allows the attached light to be directed toward the trailer hitch ball.

Figure 1:
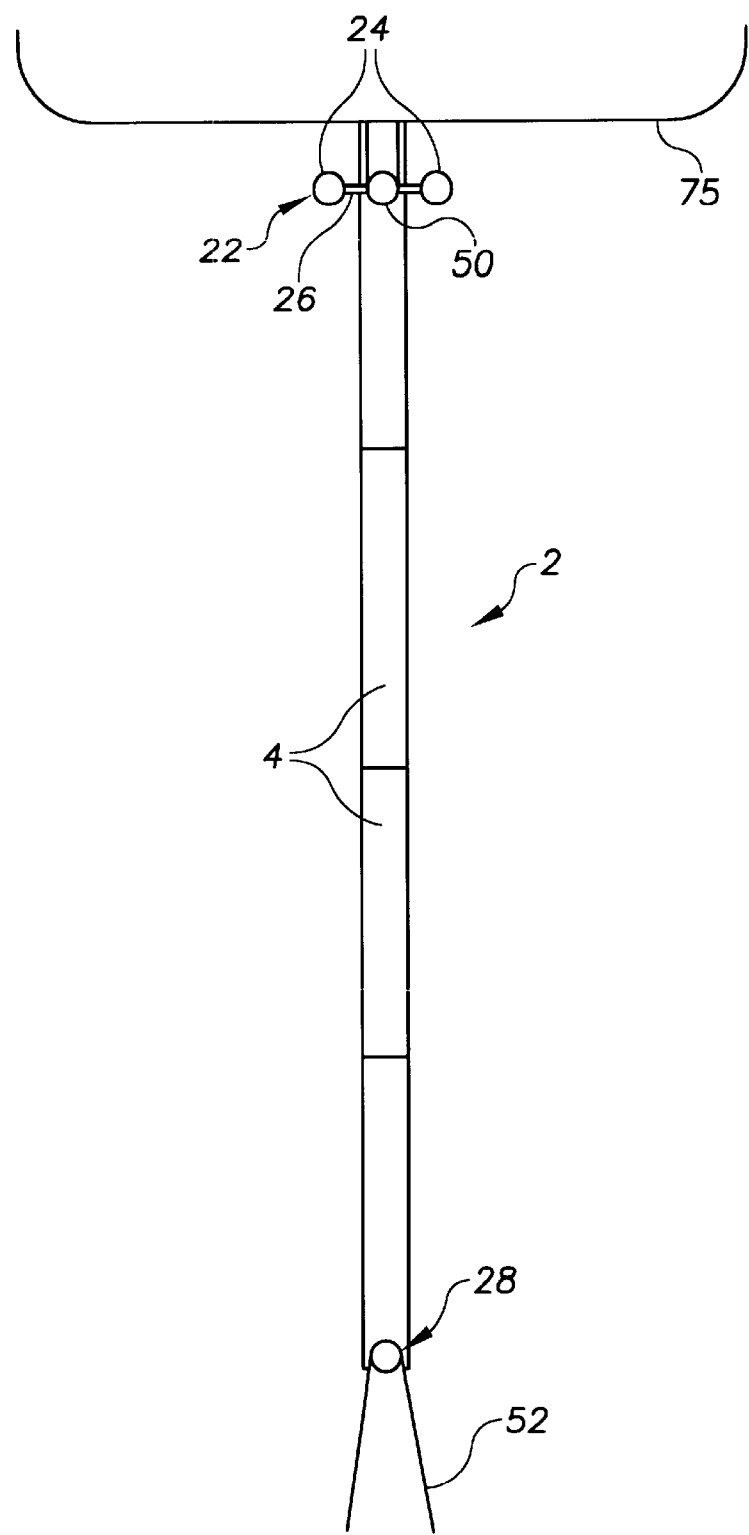
FIG. 1 is a top, plan view of the guide strip.

Now referring to FIG. 1, the device also includes a pair of targets, each for attaching to one of the trailer hitch components described above. A first target 22 is attached to the trailer hitch ball and includes a pair of spaced outer cups 24 with an inner cup 50 disposed therebetween. The inner and outer cups are interconnected with a cross member 26 to form a unitary target. The inner cup includes a magnet on a lower portion thereof for magnetically securing the first target to the upper surface of the trailer hitch ball.

A second target includes a single cup 28 that is magnetically secured to the upper surface of the trailer coupling. The second target and outer cups on the first target preferably have identically or similarly configured exterior surfaces whereas the inner cup has a unique exterior surface. For example, the outer cups and the second target could be yellow while the inner cup could be orange. Therefore, when the driver is observing the two targets in the rear or side view mirrors as described in more detailed below, he can determine that the two trailer hitch components are properly aligned when he or she sees three perfectly aligned yellow cups. As will be readily apparent to those skilled in the art, the exterior surface of each of the cups could have any type of color, pattern, indicia or similar identifying insignia applied thereto.

To use the above described device, the first target is attached to the upper surface of the trailer hitch ball while the second to target is attached to the upper surface of the trailer coupling. The guide strip is unfolded and placed on the ground with a first portion immediately beneath the ball and a second portion immediately beneath the coupling thereby providing a guide path therebetween. The convex mirror is mounted on the rear of the vehicle using one of the mounting bracket assemblies. The bracket assembly and mirror are adjusted such that the first target and alignment strip are readily visible in the vehicle rear view mirror when the driver is properly seated in the passenger compartment. The driver then reverses the vehicle while guiding the inner cup along the alignment strip. The driver continues reversing until the second target is perfectly superimposed on the inner cup at which time the inner cup will not be visible. The driver will then observe three perfectly aligned yellow cups indicating that the two trailer hitch components are properly aligned. The driver then stops the vehicle, activates the parking brake and lowers the trailer onto the trailer hitch ball.

The above described components are preferably constructed with steel, stainless steel, aluminum, polystyreen plastic or a similar durable material. However, as will be readily apparent to those skilled in the art, the size, shape and materials of construction of each of the components can be varied to suit a particular application. Furthermore, the above described device is not to be limited to the exact details of construction and enumeration of parts as depicted and described. For example, although the bracket assembly legs are length adjustable using sleeves, the leg could be formed of locking, telescoping sections or in any other conventional manner that allows the length to be selectively varied. In addition, the targets can be secured to their respective hitch components using any type of fasteners.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed it is:

1. A trailer hitch guide device comprising:

an elongated guide strip having a first portion for placing beneath a trailer hitch ball on a towing vehicle and a second portion for placing beneath a coupling on a trailer thereby providing a guide path therebetween;

a first target mounted on a trailer hitch ball;

a second target mounted on a trailer coupling;

a convex mirror assembly mounted on a rear portion of a towing vehicle whereby a driver guides said first target along said alignment strip until said first and second targets are aligned in a predetermined manner.

2. The alignment device according to claim 1 wherein said first target includes a pair of outer cups with an inner cup disposed therebetween, said inner cup attached to said trailer hitch ball.

3. The alignment device according to claim 2 wherein said second target includes a cup secured to said trailer hitch coupling.

4. The alignment device according to claim 3 wherein said pair of outer cups and said second target each have similarly configured exterior surfaces allowing a driver to easily determine when said outer cups and said second target are properly aligned.

5. The alignment device according to claim 1 wherein said convex mirror assembly is mounted on the rear portion of towing vehicle using an adjustable bracket for selectively positioning said convex mirror relative to a towing vehicle.

6. The alignment device according to claim 5 wherein said adjustable bracket includes a length adjustable leg having an upper end and a lower end, said convex mirror attached to the upper end, said lower end having a clamp attached thereto for securing said leg to the towing vehicle.

7. The alignment device according to claim 5 wherein said adjustable bracket includes:

a leg having an upper end and a lower end, the upper end adapted to be fastened to said convex mirror;

means for attaching said leg to the towing vehicle.

8. The alignment device according to claim 7 wherein said means for attaching said leg to the towing vehicle comprises:

at least one arm mounted on said leg, said arm having two opposing ends;

a suction cup mounted on one of said ends.

9. The alignment device according to claim 5 further comprising a light removably attachable to said bracket assembly for projecting light toward said first target and said trailer hitch ball.

10. The alignment device according to claim 1 wherein said guide strip includes multiple hinged sections allowing said guide strip to be collapsed for storage.

11. The alignment device according to claim 6 wherein said bracket includes a substantially S-shaped bypass attachment removably secureable to said leg allowing said bracket to circumvent an exteriorly mounted spare tire.

* * * * *